United States Patent [19]

Mahoney

[11] Patent Number: 5,372,375
[45] Date of Patent: Dec. 13, 1994

[54] COILED BICYCLE STAND

[76] Inventor: Thomas P. Mahoney, #5 Collins Isle, Balboa Island, Calif. 92662

[21] Appl. No.: 30,826

[22] Filed: Mar. 12, 1993

[51] Int. Cl.$^5$ ............................................. B62H 1/06
[52] U.S. Cl. .................................. 280/304; 280/293; 242/404.2
[58] Field of Search ............... 280/293, 294, 296, 295, 280/297, 298, 304; 248/351, 160; 242/84.8, 107.3; 70/235

[56] References Cited

U.S. PATENT DOCUMENTS

| | | | |
|---|---|---|---|
| 551,401 | 12/1895 | Pine | 280/298 X |
| 635,618 | 10/1899 | Weyde . | |
| 717,271 | 12/1902 | Rasmusson | 280/296 |
| 812,547 | 2/1906 | Cook | 280/298 |
| 1,150,821 | 8/1915 | Herrington | 242/107.3 |
| 2,535,803 | 12/1950 | Maack | 248/160 |
| 2,999,696 | 9/1961 | Ringelstetter | 280/296 |
| 3,482,798 | 12/1969 | Kawaguchi | 242/107.3 |
| 4,944,097 | 7/1990 | Kang | 242/107.3 X |
| 4,986,557 | 1/1991 | Muszynski | 280/298 |

FOREIGN PATENT DOCUMENTS

| | | | |
|---|---|---|---|
| 0052593 | 3/1935 | Denmark | 280/296 |
| 0623259 | 1/1935 | Germany | 280/293 |
| 0038518 | 11/1933 | Netherlands | 280/296 |
| 0283429 | 1/1928 | United Kingdom . | |

Primary Examiner—Karin L. Tyson
Assistant Examiner—F. Zeender
Attorney, Agent, or Firm—Thomas P. Mahoney

[57] ABSTRACT

A bicycle stand includes a flexible supporting arm adapted to be retracted into coiled condition within an associated housing. When extended from the housing, the arm is angularly oriented by guide means on the housing. A brake keeps the supporting arm extended.

14 Claims, 1 Drawing Sheet

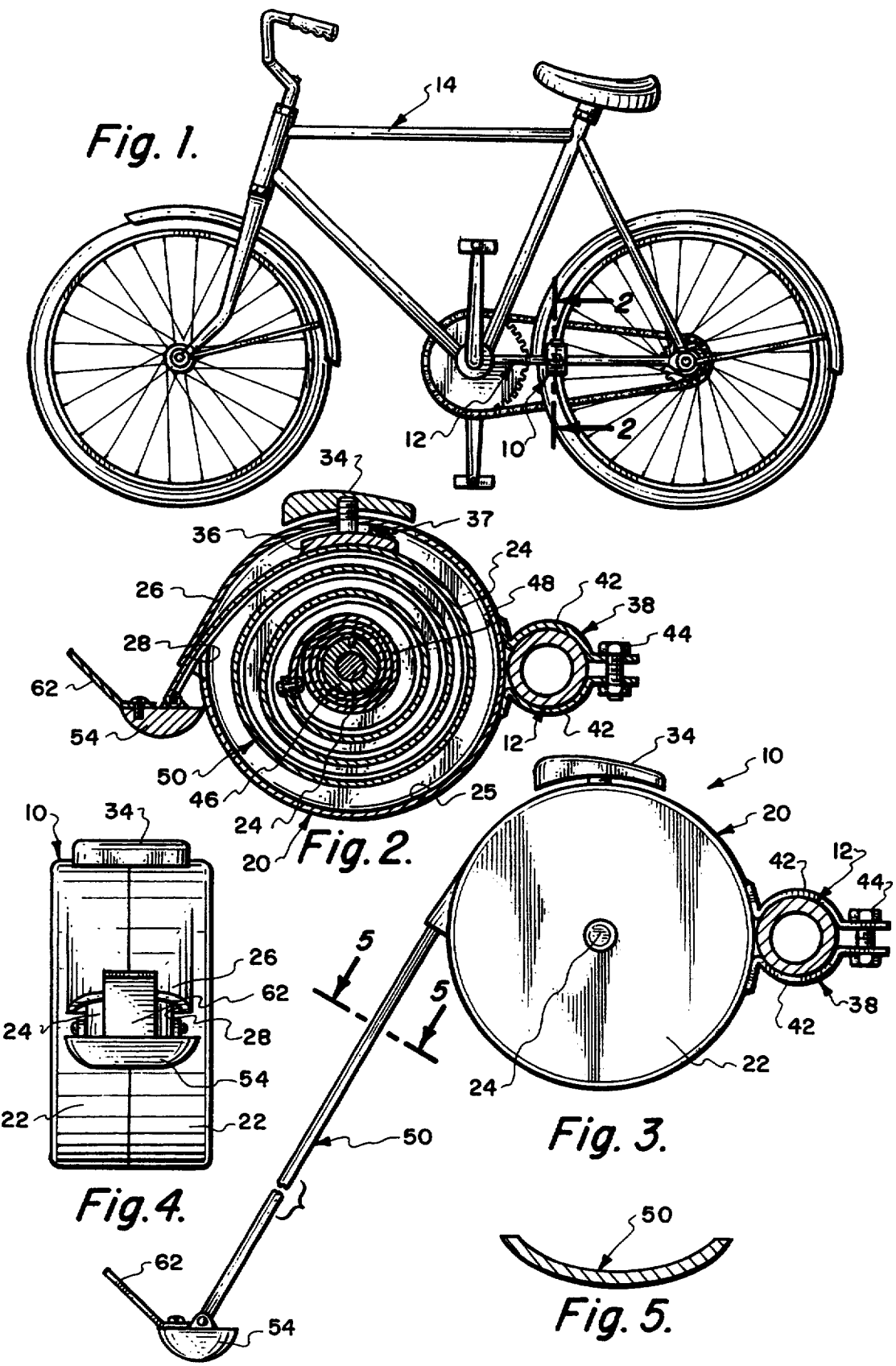

COILED BICYCLE STAND

This invention relates to bicycle stands and more particularly, to a bicycle stand which is characterized by the fact that it is coiled in a housing or on a support and which is much safer and easier to use and install than conventional bicycle stands.

BACKGROUND OF THE INVENTION

Conventional bicycle stands usually consist of a mounting bracket and an elongated, rigid supporting arm which is disposable in a retracted position or an extended position in which the lower extremity of the arm engages the adjacent ground surface. Such arms are conventionally pivotally mounted on the mounting bracket.

Recent innovations in bicycle technology, particularly the mountain bike, raise questions as to the utility and safety of the above-described bicycle stand. This is due to the fact that mountain bikes are built for rough terrain and, frequently, conventional bicycle stands have the supporting arm dislodged because of the jarring to which the mountain bike is subjected, resulting in severe injury to the rider or, at the very least, damage to the bike.

The art also teaches the provision of rigid, axially-extendable, spring-biased or spring-retractable bicycle stands having elongated supporting arms extensible from a corresponding tubular or other housing.

Various other types of bicycle stands are disclosed in the following U.S. Letters Patents:

| U.S. Pat. No. | Inventor | Issue Date |
| --- | --- | --- |
| 355,413 | Read | Jan. 4, 1887 |
| 576,346 | Jerome, et al. | Feb. 2, 1897 |
| 607,395 | Hunt | Jul. 12, 1898 |
| 635,618 | Weyde | Oct. 24, 1899 |
| 1,962,547 | Zerk | Jun. 12, 1934 |
| 4,288,090 | Muller | Sep. 8, 1981 |
| 4,819,957 | Printy | Apr. 11, 1989 |

However, none of the prior art bicycle stands is of a compact construction adapted to be incorporated in a relatively small housing or mounted on a relatively small support easily attached to the desired location on the frame of the bicycle and being retracted so that accidental dislodgment is precluded.

OBJECTS AND ADVANTAGES OF THE INVENTION

It is, therefore, an object of my invention to provide a bicycle stand which includes a support or housing securable at the desired location on the frame of the bicycle and provided with an elongated flexible supporting arm which is adapted to be coiled upon itself on its support or within its housing and which has a ground engaging member at its lower extremity.

Another object of the invention is the provision of a bicycle stand of the aforementioned character in which locking means is associated with the supporting arm to maintain said arm in the extended position after it has engaged the surface of the ground.

A further object of the invention is the provision of a bicycle stand of the aforementioned character in which the aforesaid extensible arm is flexible and adapted to be spirally wound upon said support or within said housing in order to maintain said arm in retracted position on said support or within said housing.

Another object of the invention is the provision of a bicycle stand of the aforementioned character in which said extensible, retractable supporting arm has retraction spring means associated therewith to permit said supporting arm to be retracted into said housing or onto said support when the aforesaid locking means is released, thus permitting the retraction of the supporting arm by merely releasing the associated locking means.

Other objects and advantages of the invention will be apparent from the following specification and the accompanying drawings.

BRIEF DESCRIPTION OF THE DRAWINGS

FIG. 1 is a side elevational view showing a bicycle with the stand of the invention operatively connected to a component thereof;

FIG. 2 is a partially sectional view taken on the broken line 2—2 of FIG. 1 and showing the various components of the stand;

FIG. 3 is a side elevational view of the stand with the flexible member extended to bring the ground engaging member into contact with the surface of the ground;

FIG. 4 is a front elevational view of the stand; and

FIG. 5 is a transverse sectional view taken on the broken line 5—5 of FIG. 3.

DESCRIPTION OF PREFERRED EMBODIMENT OF THE INVENTION

Referring to the drawings, and particularly to FIGS. 1-3 thereof, I show a bicycle stand 10 secured to the frame 12 of a bicycle 14. Although the stand 10 is shown as affixed to a frame member extending rearwardly into supporting relationship with the rear wheel of the bicycle, it will be obvious to those skilled in the art that other locations can be utilized to affix the stand in cooperative relationship with a bicycle.

The stand 10 includes a substantially cylindrical housing 20, said housing consisting of mating components 22 which may be secured in operative relationship with each other by a fastener 24. The housing may be fabricated from metal, synthetic plastic by injection molding or well known methods and materials customarily used in fabricating housings of the type under consideration here.

The cooperative halves 22 of the housing 20 define a cylindrical chamber 25, FIG. 2, and a guide member 26 is provided by the cooperative halves 22 for a purpose which will be described in greater detail below. It will be noted that the guide member 26 defines an elongated slot 28 which is oriented angularly with respect to the vertical orientation of the bicycle 12. Also provided in the perimetrical wall of the housing 20 is an access slot 32 in which is mounted an actuating member 34 for a detent or brake 36 located in the interior of the housing.

Secured to the perimeter of the housing 20 diametrically opposite the slot 28 and the guide member 26 defining the same is a securement clamp 38, said clamp consisting of symmetrical halves 42 of generally semi-circular configuration and of a size to encompass the tubular frame member of the bicycle 14 and be retained in operative relationship therewith by a bolt/nut combination 44. The crank of the bicycle will normally clear the housing 20. If it does not, it may be shifted rearwardly on the frame 12.

Wound about and connected to a spindle 46 which constitutes the shank of the fastener 24 is a torsion spring 48 which is secured to an elongated extensible-retractable arm means 50 which can be fabricated from a plurality of different types of materials such as spring steel, synthetic plastic, or the like. As best shown in FIG. 5 of the drawings, the extensible-retractable member 50 has an arcuate cross-section intended to impart rigidity to the member when it is in its extended position while still permitting retraction into the coiled configuration of FIG. 2. The slot 28 in the guide member 26 is formed with a correspondingly arcuate slot 28.

The undersurface of the friction latch or brake 36 engages the perimeter of the extensible-retractable flexible arm member 50 as it is withdrawn from the housing 20 through the slot 28 and thus maintains the arm member 50 in its extended position. A spring 37 engages the interior of the housing 20 and urges the brake 36 against the adjacent surface of the arm member 50. Pivotally connected to the lower extremity of the strip of metal or other material constituting the arm 50 is a ground engaging member 54 which engages the surface of the ground in the manner shown in FIG. 3 of the drawings when the elongated flexible arm 50 is withdrawn from the housing 20. Since the guide member 26 and exit slot 28 are oriented angularly with respect to the frame member 12 of the bicycle 14, the supporting arm 50 is correspondingly angularly oriented and supports the bicycle 14 in essentially the same manner as a conventional bicycle stand.

The brake or latch 36 maintains the member 50 in extended position until it is withdrawn from engagement with the corresponding surface of the strip constituting the member 50. If the strip constituting the member 50 is fabricated from torsionally wound spring steel, it will withdraw automatically into the chamber 25 provided by the housing 20.

Alternatively, the strip can be retracted by the torsion spring 48. To facilitate the utilization of the bicycle stand 10 in a manner analogous to conventional bicycle stands, that is, to permit the withdrawal of the flexible member from the housing 20 by the foot of the user, the ground engaging member 54 can be provided with a protrusion 62 which can be engaged by the foot of the bicyclist. When it is desired to retract the extended flexible member 50, the latch slide 34 can also be engaged by the foot and the inherently tensional spring 48 will automatically retract the arm 50.

The compact size and light weight of the stand 10 of the invention make it immeasurably superior to conventional bicycle stands. Moreover, the small size enables it to be mounted on the frame of the bicycle in locations where the mounting of conventional stands is not feasible.

In addition, the elongated flexible arm cannot be dislodged from its retracted position when it is utilized on mountain bicycles or similar bicycles which are ridden on rough terrain. Therefore, the safety hazards incident to the use of conventional kick-stands on mountain and similar bicycles are eliminated.

Moreover, the angular orientation provided by the guide member 26 causes the extensible arm 50 to assume the required angular orientation in the extended position.

I claim:

1. In a bicycle stand for a bicycle having a frame, the combination of: a support securable to the frame of said bicycle; an axially extensible and retractable means coiled upon itself on said support for extension therefrom and retraction thereupon between extended and retracted positions, said means when extended being rigid in compression to support said bicycle; and ground engaging means on an extremity of said extensible and retractable means.

2. The bicycle stand of claim 1 in which said extensible and retractable means is flexible.

3. The bicycle stand of claim 1 in which said extensible and retractable means is constituted by an elongated, flexible member normally disposed in retracted position on said support but extensible therefrom to bring said ground engaging member into engagement with the contiguous surface of the ground to support said bicycle.

4. The bicycle stand of claim 1 in which a lock is provided on said support to lock said extensible and retractable means in extended position.

5. The bicycle stand of claim 2 in which a lock is provided on said support to lock said extensible and retractable means in extended position.

6. The bicycle stand of claim 3 in which said support is provided with a lock to maintain said extensible and retractable means in extended position.

7. In a bicycle stand for a bicycle having a frame, the combination of: a housing securable to the frame of said bicycle; an extensible and retractable, flexible arm coiled upon itself in said housing and movable from said housing between retracted and extended positions, said arm in its extended position being rigid in compression to support said bicycle; and a ground engaging member on said arm.

8. The bicycle stand of claim 7 in which said arm is disposed in coiled position in such housing when it is in its retracted position.

9. The bicycle stand of claim 8 in which said housing has locking means engagable with said arm to maintain said arm in the extended position.

10. The bicycle stand of claim 7 in which said arm has retraction means associated therewith to cause retraction of said arm into said housing.

11. The stand of claim 10 in which said housing has locking means thereupon engagable with said arm to maintain said arm in its extended position.

12. In a bicycle stand, the combination of: a supporting arm normally maintained in a coiled condition in which it is coiled upon itself, said arm being movable from the coiled condition into an uncoiled, extended condition to support a bicycle, said arm in its extended condition being rigid in compression to support said bicycle; and ground engaging means on an end of said arm.

13. The stand of claim 12 including a brake to maintain said arm in the extended condition.

14. The stand of claim 12 including spring means connected to said arm for retracting the arm into the coiled condition.

* * * * *